Feb. 5, 1952 F. E. HAND ET AL 2,584,200
TRACTOR-MOUNTED IMPLEMENT AND MARKER
Filed March 23, 1946 3 Sheets-Sheet 1
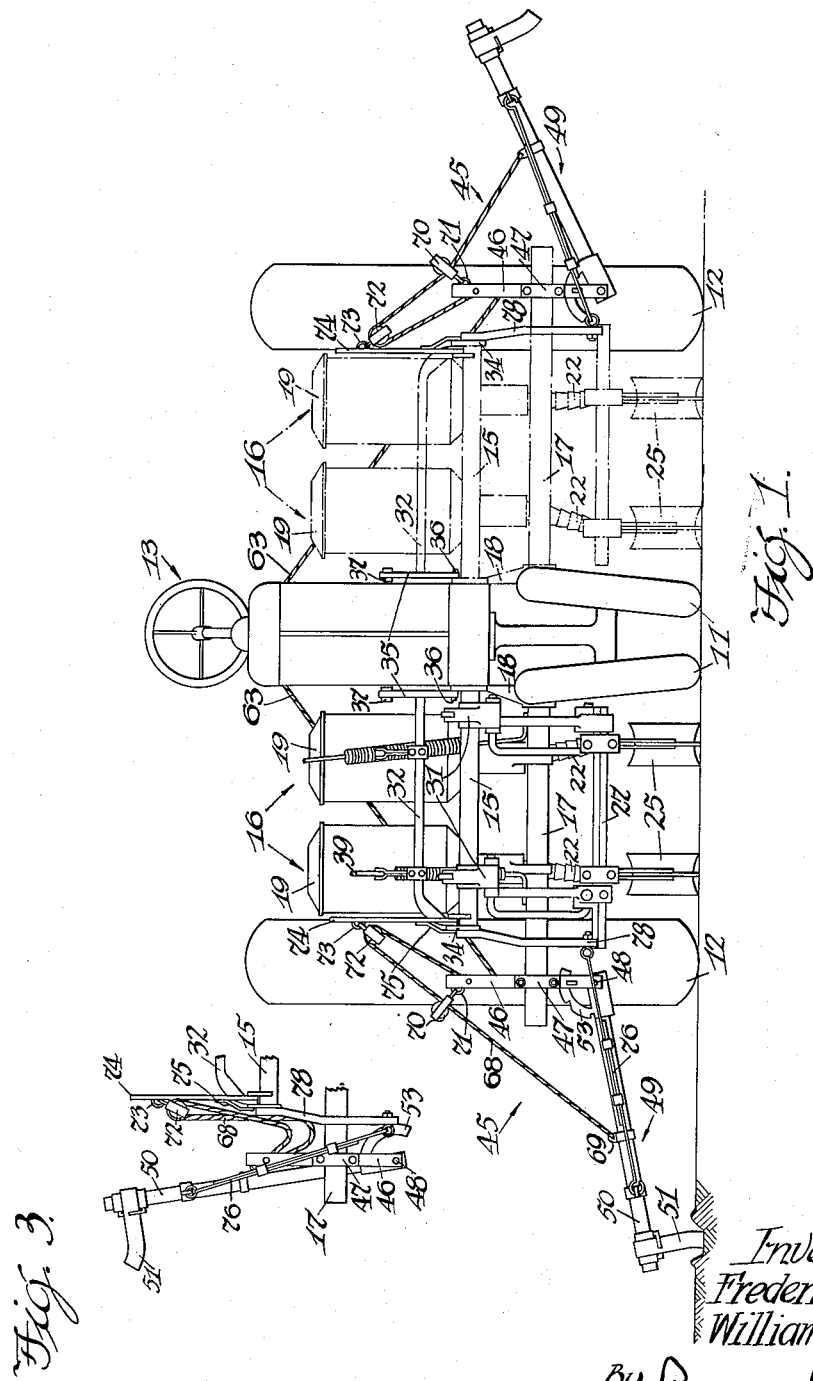
Inventors
Frederick E. Hand
William O. Graham
By Paul O. Pippel
Atty.

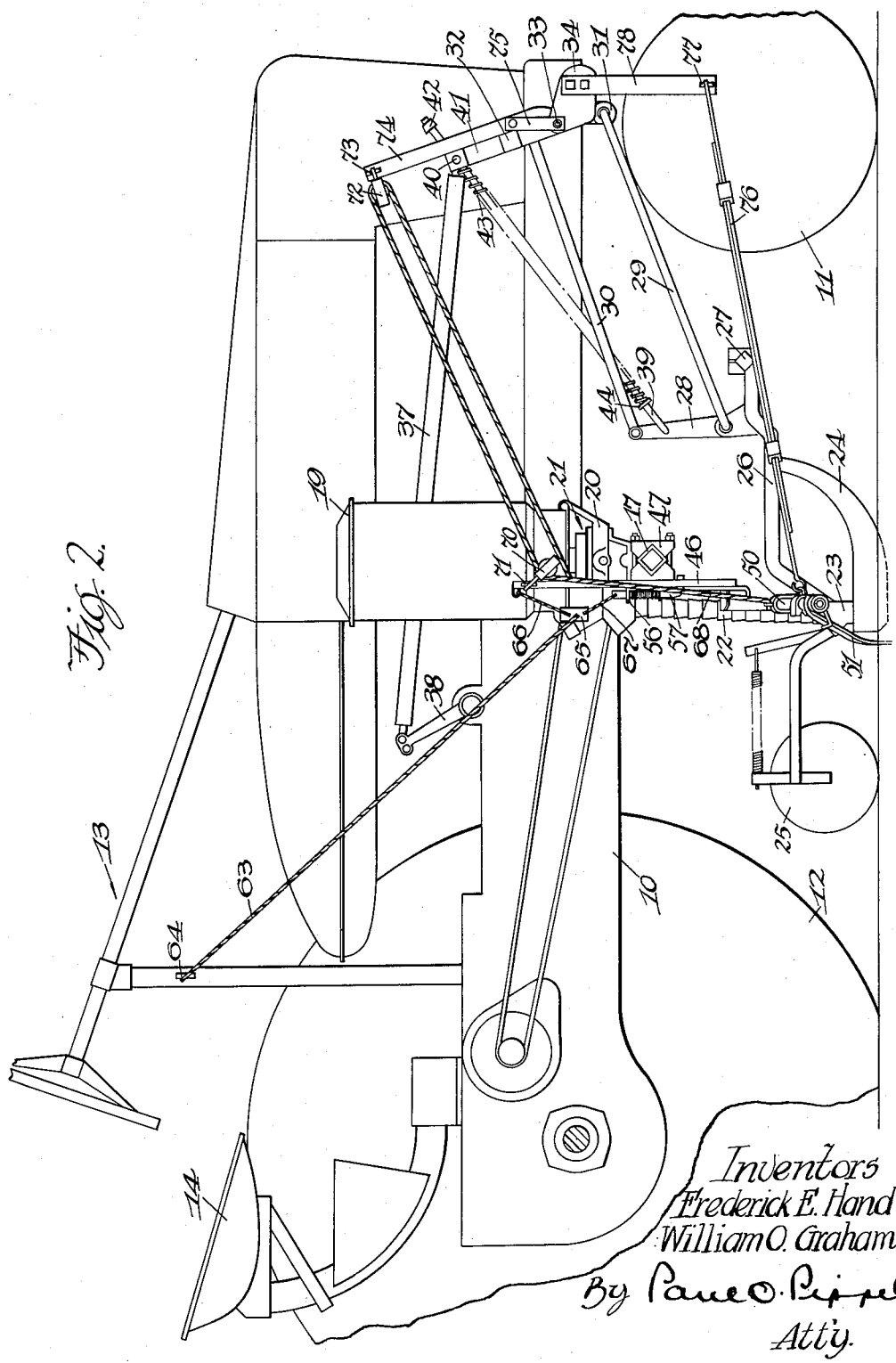

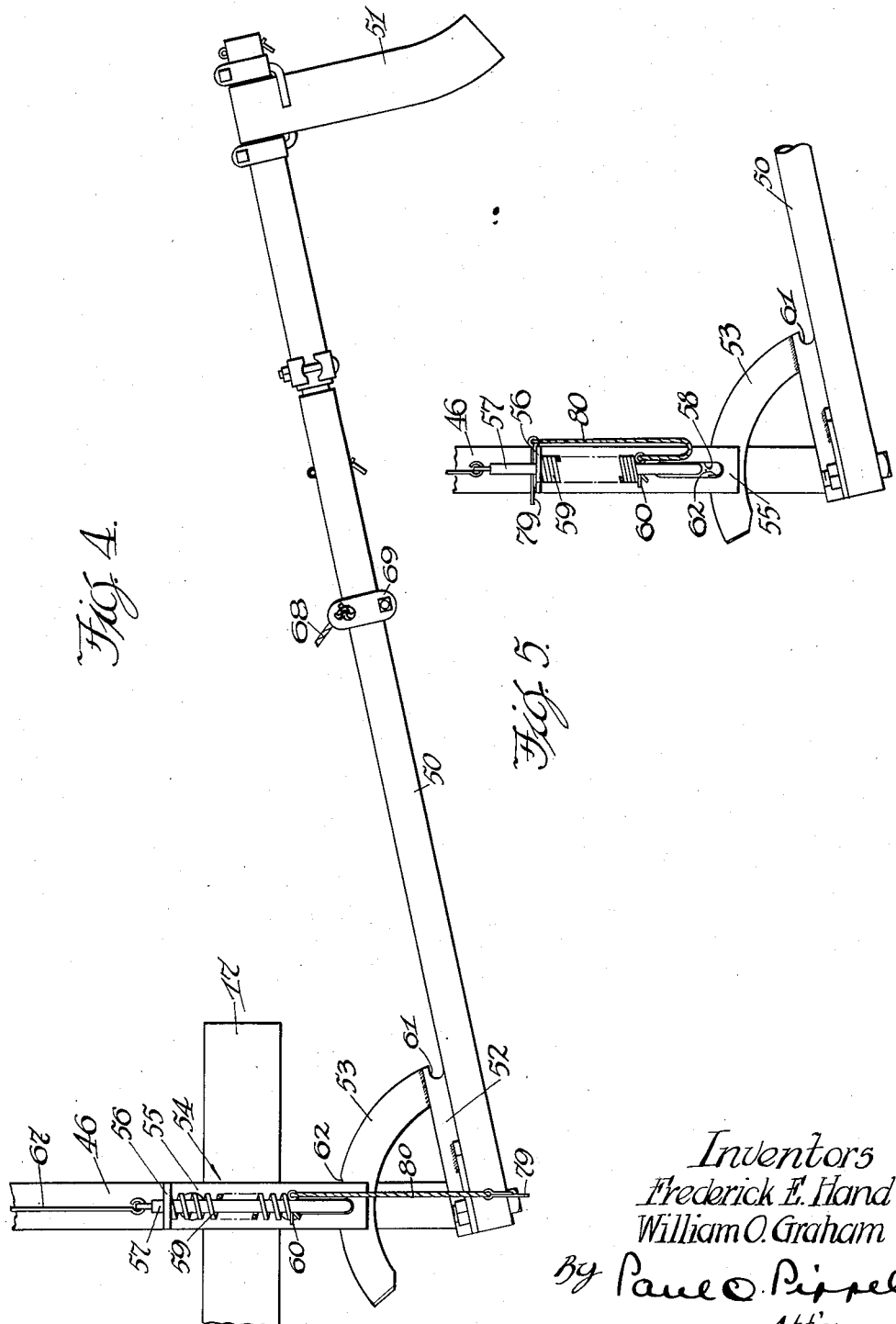

Patented Feb. 5, 1952

2,584,200

UNITED STATES PATENT OFFICE 2,584,200

TRACTOR-MOUNTED IMPLEMENT AND MARKER

Frederick E. Hand, Canton, and William O. Graham, Lewistown, Ill., assignors to International Harvester Company, a corporation of New Jersey Application March 23, 1946, Serial No. 656,554

1 Claim. (Cl. 97—230)

This invention relates to agricultural implements and particularly to planters. More specifically the invention relates to a tractor-mounted planter and to a marker structure therefor.

Planting implements utilizing markers generally provide a marker at each side of the planter to be alternately placed in operation when traveling back and forth across a field. In such case only one marker is in use at a time depending upon which direction the planter is traveling across the field. The operating marker is generally moved to inoperative position by manipulation of a cable connected to the marker and accessible to the planter operator. In contrast with the method of planting back and forth across a field, another planting method involves going around the field instead of back and forth across it. In such case only one marker is needed depending upon whether the turn is made to the right or to the left. When the planter is mounted upon or drawn by a tractor, the operator manipulates the marker from his tractor seat. In tractor operation difficulties arise due to the necessity of the operator performing several functions when the end of a row is reached and the tractor is to be turned. Then, since the lifting of the furrow opener units and the marker are separate operations, the operator often forgets the marker or is slow in raising it, and since the marker engages the ground rather aggressively it is damaged during turning of the implement.

An object of the present invention is to avoid the foregoing difficulties and to provide an improved marker structure for a planter wherein the operating marker is lifted at the same time as the furrow opener units in one operation.

Another object of the invention is to provide a marker which rises and falls automatically with the raising and lowering of the furrow opener units eliminating any likelihood of injury to the marker.

A further object of the invention is to provide in a power lifted planter having a marker and connecting means between the lift structure and the marker for raising the latter, a latch for holding the marker out of operating position and optionally operable means for rendering the latch inoperative so that the marker will rise and fall with the raising and lowering of the furrow opener units.

A still further object of the invention is to provide for a marker adapted to swing generally vertically between operating and transport positions a latch structure adapted to hold the marker in an inoperative position between operating and transport positions.

Other objects and advantages will become clear from the following detailed description when read in conjunction with the annexed drawings, wherein:

Figure 1 is a view from the front of a tractor of the tricycle type having a planter mounted thereupon embodying the features of the present invention.

Figure 2 is a view in side elevation on a larger scale of the structure shown in Figure 1.

Figure 3 is a detail of the marker structure in its transport position.

Figure 4 is an enlarged detail of the marker structure showing it in an intermediate raised position, and Figure 5 is a detail of the marker structure and the latch mechanism therefor and illustrating the manner in which the latch is maintained out of engagement with the marker arm.

Referring to the drawings, it will be noted that the planter embodying the features of the present invention is mounted upon a tractor having a body 10, dirigible front wheels 11, and rear drive wheels 12. The tractor is further provided with steering mechanism indicated at 13 and an operator's station 14.

Projecting laterally from opposite sides of the tractor at the front end thereof are transversely extending tool bars 15 at opposite sides of the tractor. These tool bars serve for the attachment to the tractor of furrow opener units 16, two of which are shown on each side of the tractor. Inasmuch as the furrow opener units are substantial duplicates, similar numerals will designate similar parts of each. The units 16 on each side of the tractor are mounted upon laterally projecting tool bars 17, one at each side of the tractor. Each tool bar is affixed at its inner end to a plate 18 secured to and depending from the tractor body.

Each of the furrow opener units 16 includes a dispensing can 19 which rests upon a bracket 20 attached to the tool bar 17 and provided with conventional seed plate mechanism indicated at 21 for directing seed into a flexible tube 22 through which it is delivered to a seed boot 23 having associated therewith a furrow opener 24. To the rear of the furrow opener 24 is provided a covering wheel 25, and the entire furrow opening unit is mounted upon a longitudinally extending beam 26 which is clamped to a transverse bar 27. Likewise secured to the bar 27 is an upright bracket 28 having pivotally connected thereto at vertically spaced points the rear ends of generally parallel links 29 and 30, the forward ends of which are pivotally connected to a bracket 31 mounted upon the tool bar 15.

The furrow opener unit is vertically moved between operating and transport positions by a lifting mechanism including a bail 32 which extends transversely of the tractor and has its outer end bent downwardly and apertured for pivotal mounting upon a pin 33 mounted in a plate 34 affixed to the outer end of the tool bar 15. The inner end of the bail 32 has secured thereto an upright arm 35, the lower end of which is pivoted upon a stud 36 at the side of the tractor and having its upper end projecting upwardly from the transverse portion of the bail. The upper end of the arm 35 has pivotally connected thereto one end of a push pipe 37, the rear end of which is connected to a rock arm 38 mounted upon the side of the tractor and rocked in any conventional manner by power derived from the tractor power plant. Rocking of the arm 38 forwardly causes forward movement of the bail 32 and lifting of the furrow opener unit. A similar rock arm 38, not shown, is provided on the left-hand side of the tractor for lifting the left-hand unit 16. The furrow opener 24 of the unit is urged downwardly to its work by a push rod 39, one end of which is pivotally connected to the bracket 28 and the other end of which is received for sliding movement in a swivel 40 mounted in the upper end of an arm 41 secured to the bail 32. The upper end of the rod 39 is provided with a collar 42, and the rod is surrounded by a spring 43 which abuts a collar 44 at its lower end and the swivel 40 at its upper end. It should now be clear that rocking of the bail 32 through the intermediary of the push pipe 37 and rock arm 38 causes vertical swinging movement of the parallel links 29 and 30 and of the earth-working elements of the planter.

In order to guide the tractor operator in planting succeeding rows, a marker structure generally indicated at 45 is provided, and in Figure 1, one is shown as provided at each side of the tractor. When planting back and forth across a field the marker units at opposite sides of the tractor are used alternately depending upon the direction in which the tractor is traveling. Since the marker units are substantially identical a description of one will suffice for both. It will be noted that the marker structure includes an upright standard 46 secured by means of a clamp 47 adjacent the outer end of the transverse bar 17. The lower end of the standard 46 has pivotally connected thereto at 48 a marker arm 49 including an elongated tubular member 50 having secured to its outer end a ground scorer 51. Secured to the inner end of the pipe 50 is a plate 52 having affixed thereto, as by welding, a sector or quadrant 53 arranged to engage a detent mechanism or latch 54 carried by the standard 46 and including a plate 55 bolted to the standard 46 and having at its upper end an outwardly extending flange 56 apertured to receive a vertically extending detent pin 57 for sliding movement therein. The lower end of the pin 57 is bent inwardly as indicated in Figure 2 and is slidably received in a slot 58 in the lower end of the plate 55. Surrounding the pin 57 is a spring 59, the upper end of which abuts against the lower surface of the flange 56 and the lower end of which abuts against a cotter key 60 passed through an opening in the pin 57. As viewed in Figure 4, pin 57 is arranged to engage the arcuate surface of the quadrant 53 and to be received in notches 61 and 62 therein, the notch 61 being provided to maintain the marker arm in its vertical transport position and notch 62 being provided to maintain the marker arm in an intermediate position as indicated in Figure 4 and on the left side of the tractor in Figure 1.

Pin or detent 57 is released from engagement with the quadrant 53 and the notches therein by a cable 63, the upper end of which is tied to a lug 64 on the steering mechanism 13 and the lower end of which is connected to a plate 65 which in turn is connected to the upper end of standard 46 by a link 66 and to the upper end of detent 57 by a link 67. The operator from his position upon the seat 14 is thus in easy reach of the cable 63 to release the latch 54 and permit the marker arm to drop to operating position.

As pointed out before, when going back and forth across a field the marker structures 45 are placed alternately in operation. In Figure 1 it will be noted that the left-hand marker arm is in a position about half way between operating position and the transport position shown in Figure 3, while the marker arm on the right-hand side of the tractor is in operating position. In the position of the left-hand marker arm shown in Figure 1, the detent 57 is received in the notch 62 of the quadrant 53. The marker arm may be placed in operating position by the operator grasping the cable 63 and releasing the latch which holds it in its semi-raised position. From the position of the parts shown in Fig. 1 the left-hand marker 45 is lowered and the right-hand marker 45 is raised when the end of a row is reached and the tractor is turned to reverse its direction across the field. The furrow opener units are likewise raised to their inoperative position at the time the tractor is turned. In order to coordinate these two movements and provide means for lifting the marker structure in operating position at the same time that the furrow opener unit in operating position is raised, a flexible cable 68 is provided, one end of which is connected to a bracket 69 mounted on the arm 50 between the ends thereof. Cable 68 is passed upwardly through a pulley 70 connected to a lug 71 at the upper end of the standard 46 and through a pulley 72 connected to a lug 73 at the upper end of an arm 74, the lower end of which is pivotally mounted upon the bolt 33. Arm 74 is braced by a strap 75 which is secured at one end to the arm and at its other end is mounted upon the pin 33. The other end of the cable 68 is anchored to the upper end of the standard 46. Arm 74, it will be noted, is curved rearwardly so that it rests against the bail 32 as shown in Figure 2. Therefore, forward rocking of the bail 32 causes forward rocking of the arm 74 which acts through flexible cable 68 to lift the marker arm 50 simultaneously with the lifting of the furrow opener units 16. Upon the lifting of the furrow opener unit and the marker at the end of a field, the detent 57 engages the notch 62 and holds the marker arm in the position indicated at the left side of the tractor in Figure 1. The appropriate marker is released upon the tractor reversing its direction in the field by the operator manipulating the proper cable 63. The marker arm is braced by an extensible link 76 pivotally connected at one end to the marker arm and at its other end to an eye-bolt 77 at the lower end of a strap 78 affixed to the plate 34.

Under ordinary planting conditions the intermediate raised position of the marker arm is advantageous in that it does not have to drop as far to its operating position as when it has been raised to transport. The transport position, as shown in Figure 3, is indicated when planting has been completed, as the planter thus occupies less space. When planting close to fences and the like, it is also important to place the marker arm in a vertical transport position. Since the lifting of the furrow opener units does not raise the marker arm to its full transport position, it is raised the rest of the way by hand until detent 57 engages the notch 61 in the quadrant.

When planting around the field instead of back and forth across it, the implement is usually driven in one direction throughout the planting operation so that the marker arm on only one side of the tractor is in use depending upon whether the tractor is traveling to the left or to the right around the field. In such case, when a turn is made at the end of the field and the furrow opener units are raised, it is very desirable that the marker arm be raised and lowered simultaneously therewith and without the additional operation of releasing the latch 54. For this purpose a second cotter key 79 is provided attached to cotter key 60 by a flexible cable 80. Cotter key 79 is receivable in an opening provided in the upper portion of the detent pin 57 as indicated in Figure 5, the cotter key 79 resting against the upper surface of the flange 56 to maintain the detent out of engagement with the quadrant 53. The marker is now free to rise and fall automatically as the furrow opener units rise and fall.

It is believed that the operation of the planter and marker of the present invention will be clear from the foregoing description. It should likewise be understood that the invention has been described in its preferred embodiment, and that modifications may be made therein without departing from the spirit thereof or the scope of the appended claim.

What is claimed is:

A tractor-mounted implement and marker, comprising a tilling unit mounted on a tractor for vertical movement between lowered operating and raised transport positions, a marker mounted on the tractor independently of the unit for vertical swinging movement between a lowered laterally-extending operating position and a substantially upright transport position, a rockable structure on said tractor and means on the tractor to rock said structure, connecting means between the rockable structure and the unit for moving the unit between its operating and transport positions by rocking of said structure, other connecting means between the rockable structure and the marker to move the marker between its operating position and a laterally-extending raised position intermediate its operating and transport positions by rocking of said structure, a detent mechanism carried by the tractor, and a quadrant carried by the marker having a notch therein engageable by said detent to hold the marker in its transport position, said quadrant having another notch therein engageable by said detent to hold the marker in its intermediate position when the rockable structure is rocked to move the unit to its transport position and the marker to its intermediate position, said last-named notch and the connecting means for the marker permitting movement of the marker to its transport position without interference; whereby the marker is raised to its intermediate position upon raising of the unit, and the marker may be moved to its transport position without interference to reduce the lateral extent of the marker for transport through narrow spaces.

FREDERICK E. HAND.
WILLIAM O. GRAHAM.

REFERENCES CITED

The following references are of record in the file of this patent:

UNITED STATES PATENTS

| Number | Name | Date |
|---|---|---|
| 463,510 | Hervey | Nov. 17, 1891 |
| 801,962 | Barnett et al. | Oct. 17, 1905 |
| 1,911,218 | White | May 30, 1933 |
| 2,010,110 | Scarlett | Aug. 6, 1935 |
| 2,063,852 | Ray | Dec. 8, 1936 |
| 2,178,124 | Robinson | Oct. 31, 1939 |